Jan. 27, 1942.     O. E. ESVAL ET AL     2,270,876
ALTERNATING CURRENT COERCING MEANS FOR GYROSCOPES
Filed May 20, 1939      2 Sheets-Sheet 1

INVENTORS
ORLAND E. ESVAL &
CARL A. FRISCHE
BY
Herbert H. Thompson
THEIR ATTORNEY

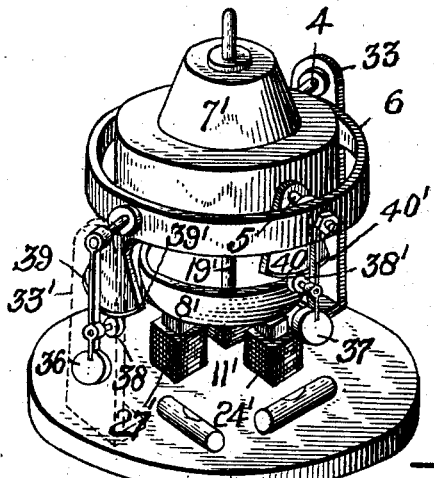
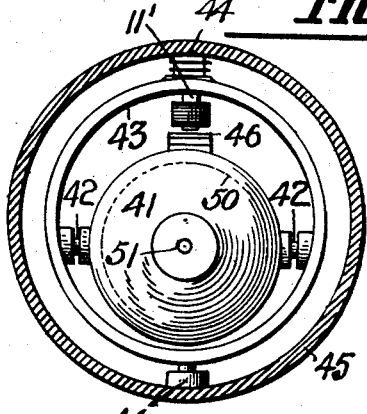
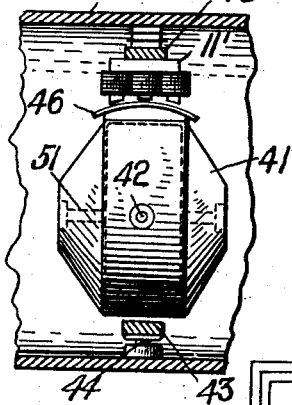
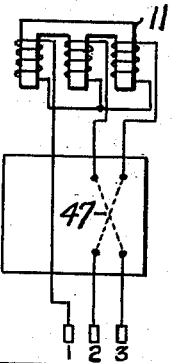
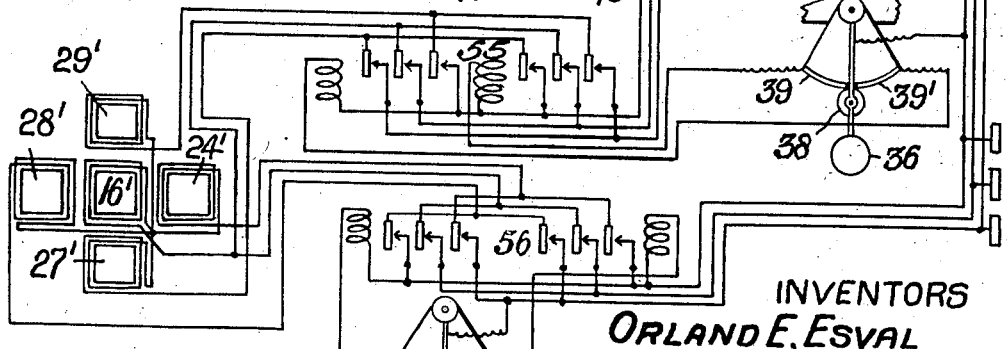
INVENTORS
ORLAND E. ESVAL
CARL A. FRISCHE
BY Herbert H. Thompson
THEIR ATTORNEY Patented Jan. 27, 1942

2,270,876

UNITED STATES PATENT OFFICE 2,270,876

ALTERNATING CURRENT COERCING MEANS FOR GYROSCOPES

Orland E. Esval, Allendale, and Carl A. Frische, Leonia, N. J., assignors to Sperry Gyroscope Company, Inc., Brooklyn, N. Y., a corporation of New York Application May 20, 1939, Serial No. 274,724

11 Claims. (Cl. 74—5)

This invention relates to the control of neutrally mounted gyroscopes, whereby the same may be maintained in any desired position in azimuth or elevation. In the latter case, the instrument would assume the form of a neutrally mounted gyrovertical in which the gravitational control is applied through our novel torque applying device. The former case may be in the form of a "slave" directional gyroscope controlled from a remote point or instrument, such as a remote magnetic compass.

Preferably, such a controlling torque should be entirely under the control of the controller and should be effective regardless of the position of the gyroscope. Usually such force is preferably small, but should be continuous and uniform. It is also desirable that the control be effected without having to transfer many electric circuits through the gyro axis of support.

This application contains matter divided from our prior joint application, now Patent No. 2,229,645, for Electromagnetic erecting means for gyroscopes, dated January 28, 1941, and is hence a continuation, in part, of said patent.

Referring to the drawings illustrating several forms our invention may assume,

Fig. 3 is a perspective view of a gyro-vertical with another form of our invention applied thereto.

Fig. 4 is a front elevation, partly in section, showing how our invention is applied to a directional gyroscope.

Fig. 5 is a side elevation of the same, partly in section.

Fig. 6 is a simplified wiring diagram thereof.

Fig. 7 is a wiring diagram applicable to the form of the invention shown in Fig. 3.

Figure 1:
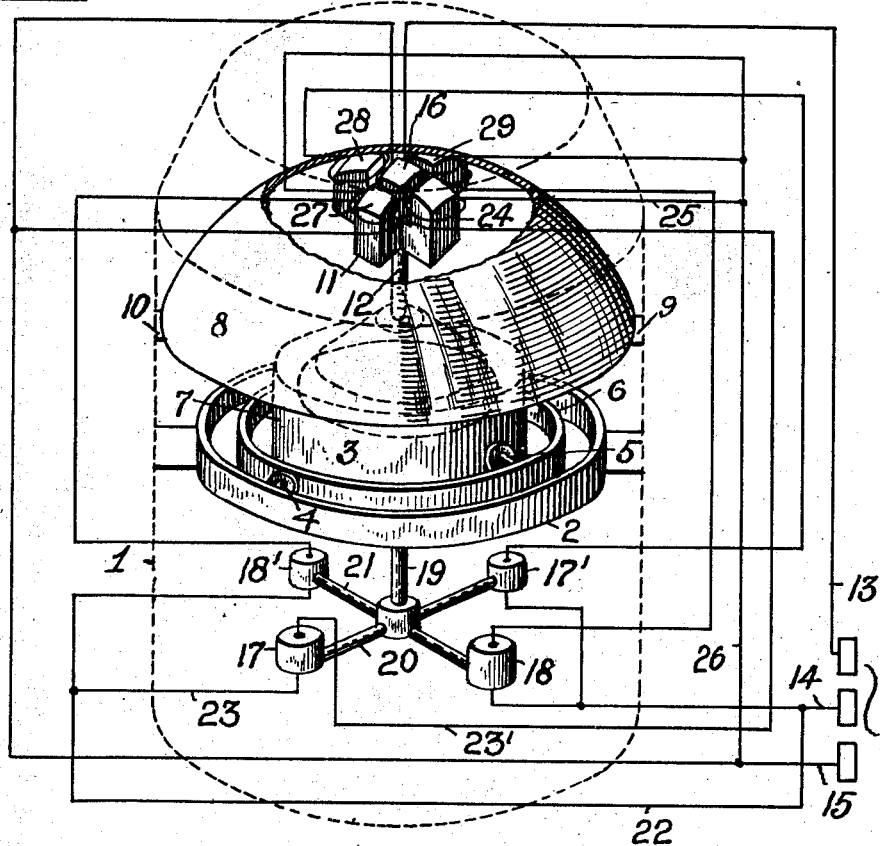
Fig. 1 is a perspective view of one form of our invention as applied to a gyro-vertical or artificial horizon, together with simplified wiring diagram thereof.

Referring first to the form of the invention shown in Fig. 1, the gyro-vertical is shown as mounted within an outer enclosure or framework 1, in which is mounted a reenforcing ring 2. The gyroscope 3 is universally and neutrally mounted within said ring on major horizontal trunnions 4 and minor horizontal trunnions 5 by means of a gimbal ring 6 within which the gyroscope rotor bearing case 7 is pivoted. The rotor (not shown) is entirely enclosed within said rotor bearing casing for spinning about a vertical axis.

The torque applying device in this instance comprises a hollow spherical shield or inductor 8 of conducting but preferably non-magnetic material, such as copper, which shield may be fixedly mounted within the frame 1 as by means of fixed brackets 9 and 10. The center of curvature of said shield preferably lies at the intersection of the axes 4 and 5 of the gyroscope. We also fixedly mount on the gyro casing 7 a multi-pole stator member 11 which is shown as mounted on a stem 12 projecting upwardly from the top of the gyro case. Said stator member is preferably of cruciform shape, comprising five poles arranged in two legs of three poles each, the vertical planes containing each leg being perpendicular to one another and preferably also normally containing respectively, the major and minor pivotal axes 4 and 5 of the gyroscope. Said poles are shown as having their exterior ends curved so as to be spaced from but to conform to the inner spherical surface of the shield or cup-like inductor 8. Any polyphase power supply may be used providing the center pole is excited by a voltage of time phase appreciably different from that of the voltage which excites the outer poles. Three-phase current is represented as supplied to the poles through leads 13, 14 and 15, but only the winding on the central pole 16 is continuously excited from one phase of the supply. The supply to the other poles is under the control of a gravitationally responsive controller or controllers, in this case comprising cross-connected liquid containers or pots 17, 17' and 18, 18', which are secured to a stem 19 projecting downwardly from the gyro case, and are supported by two tubes 20 and 21 connecting the members of each pair so that the mercury or other conducting liquid such as acidulated water, will flow to the lower pot upon tilt of the gyroscope. The flow of mercury is so small under the small tilts permitted as not to appreciably disturb the neutral equilibrium of the gyroscope. Each pot is connected across one phase of the supply so that that phase is normally open but is closed when the level in the lower pot is slightly raised, the arrangement being such that when such contact is closed, the current is supplied to a pole in quadrature thereto, i. e., 90° removed from the pot making the contact. Thus, assuming that the gyro tilts so that the switch at pot 17 makes contact, supply current may be traced from the lead 14 to lead 22, lead 23, through pot 17 to lead 23', and thence to the winding on the pole 24, removed 90° from the pot 17, and thence by way of leads 25 and 26 back to the supply lead 15.

From an inspection of Fig. 1, it will be noted that the windings of the four outside poles 24, 27, 28 and 29 are adapted to be energized from the phase leads 14 and 15 when their respective pot switches make contact, whereas the winding of the center pole 16 is continuously energized from the phase leads 13 and 15, whereby the phase of the current in the center pole winding is displaced 120° from that of the other windings, so that when one of the outside pole windings is energized, a moving field is produced passing between said outside pole winding and the center pole winding. Thus, in the condition above described, wherein the pole 24 is energized, a moving field is produced in cooperation with center pole 16, which produces eddy currents in the relatively stationary inductor 8, resulting in motor action causing a reaction or force on the stator member 11 acting at right angles to the direction of the tilt, and in a direction to precess the gyroscope back to the vertical in a straight path. If the tilt is in the opposite direction, pole 28 is excited, producing a torque in the opposite direction.

Figure 2:
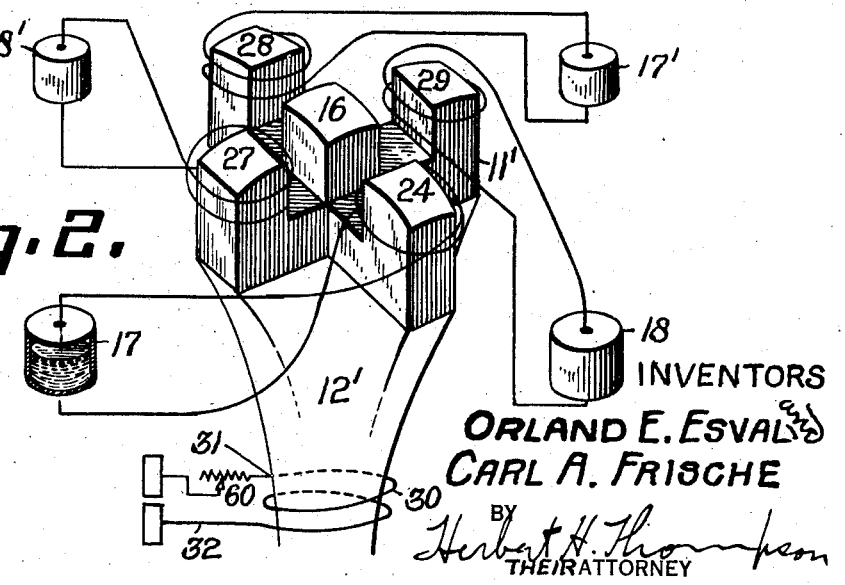
Fig. 2 is a schematic, fragmentary perspective view of the wound portion of the torque applying device, with wiring diagram, but showing a slightly modified construction.

Thus, regardless of which way the gyro tilts, or, within limits, regardless of how much it tilts, a corrective force is applied for precessing the same to the vertical. At times two of the pots will be depressed and make contact at the same time, resulting in two moving magnetic fields, the resultant of which serves to properly precess the gyro. It will be apparent that the precessing force may be varied by varying the current supply to the pole windings. Thus, resistances may be incorporated in the pots 17, 17', 18, 18', as by using acidulated water, so that as a pot descends the resistance in the circuit thereof is decreased. If desired, a variable resistance may be employed in the main circuit to vary the rate of erection. Such a resistance is shown at 60 in Fig. 2.

A sweeping or moving magnetic field may be obtained in other ways than by having the central pole winding energized in out-of-phase relation with respect to the outer poles. Thus, in Fig. 2, the stem 12' of the stator 11' is shown as provided with a winding 30 energized from single phase leads 31 and 32. The mercury contact pots 17, 17', 18, 18' may be carried by the rotor bearing casing as shown in Fig. 1, although the connection between the pots is omitted for the sake of clearness, or the pots may be merely mounted on the airplane, if desired. Each of the contacts in the pots is respectively connected in circuit with a shading coil surrounding an outer pole spaced 90° from the respective pot. Thus, pot 17 is in circuit with the shading coil on the pole 24, so that when the gyro casing tilts toward pot 17, the coil on pole 24 is short-circuited, causing a retarding of the time phase of the portion of the flux passing out of pole 24, whereby a sweeping of the flux from the central pole 16 to pole 24 is obtained, which flux, on cutting the inductor 8 (not shown in Fig. 2), induces currents which in turn produce a force on the gyro at right angles to the tilt, as before, and in a direction to eliminate the tilt.

The positions of the pole pieces or stator member 11 and of the inductor or cup 8 may be also interchanged, as shown in Fig. 3, which modification possesses the important advantage that most of the windings are on a fixed part. In Fig. 3, the gyro casing 7' is again shown as universally mounted by means of the gimbal ring 6 in the stationary brackets 33 and 33'. In this case the inductor cup 8' is shown as mounted on a stem 19' extending downwardly from the gyro case, while the stator poles 11' are mounted on the fixed base 35. The windings on the poles in this instance are shown as substantially the same as in Fig. 1, there being a polyphase supply. In this case, however, instead of employing mercury pots on the gyroscope, there is shown independently mounted pendulums, one, 36, acting about the major axis 4 of the gyroscope and the other, 37, acting about the minor axis 5 of the gyroscope. In this case we have shown the pendulums as each carrying a trolley or brush 38, 38' cooperating with reversing contacts 39, 39', 40, 40' carried by the gimbal ring 6 and gyro casing 7', respectively. As before, the pendulums are connected in quadrature with the poles.

While the pole windings may be connected as shown in Fig. 1, we have shown in Fig. 7 an alternative arrangement applicable to Fig. 1 or 3 and having certain points of superiority. In Fig. 7, the trolleys and reversing contacts indirectly control the pole windings through relays 55 and 56, respectively. The windings on the pole pieces in this case are Y-connected and the relays operate to reverse the connections to two of the lead-in wires so that the direction of the linking flux between three in-line pole pieces is reversed. In this manner the magnetic flux always extends across all three poles instead of across only two poles, as in Figs. 1 and 2, thereby securing a longer flux path and the advantage that the system remains effective through greater angles of tilt.

Our invention is shown as applied to a "slave" directional gyroscope in Figs. 4, 5 and 6. In these figures, the gyro rotor 50 spins on a normally horizontal axis 51 within a rotor bearing case 41 pivoted about horizontal axis 42 in the vertical ring 43. The vertical ring, in turn, is mounted for freedom about the vertical axis 44 in an outer casing 45. In this case, the torque applying device comprises a three-fingered stator 11'' preferably mounted within and upon the vertical ring 43. Cooperating with said stator is an inductor member or shield 46 secured to the top of the rotor bearing case, and which is in the form of a cylindrical segment curved in one plane about the axis 42 as a center. It will be readily apparent that torque may be applied to the rotor bearing casing in either direction about the horizontal axis by reversing one of the phases to the three-phase windings in the Y-connected transformer 11''. For this purpose there is shown in Fig. 6 a simple reversing switch 47 connected across one of the phases, which may be operated directly or indirectly as from a remote magnetic compass or other control means. In this form of the invention, the vertical ring constitutes a relatively fixed part with respect to rotation about axis 42, since any reactive torque about this axis exerted on said ring is absorbed by vertical pivots 44.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a gyroscopic artificial horizon, a neutrally mounted universally supported gyroscope, a device for electrically producing a transversely moving magnetic field, a second device comprising an electrical conductor inductively associated with said first device, means mounting one of said devices on said gyroscope to tilt therewith, said other device being independently supported on a fixed part adjacent thereto, gravitational means, and a controller actuated thereby for controlling the current flowing through said first device upon relative tilt of the gyroscope and gravitational means, whereby the resulting inductive reaction between said devices serves to maintain the gyroscope vertical.

2. In a gyroscopic artificial horizon universally mounted in neutral equilibrium, a conductor device mounted on said gyroscope, a fixed device adjacent said other device so as to be inductively coupled thereto, said fixed device having a plurality of polyphase windings mounted thereon and arranged in a cruciform to produce moving magnetic fields normal to each other, and a gravitational member for varying phase relations of said windings to vary the plane and direction of the moving magnetic field through said conductor to exert a torque on the gyroscope in the proper direction and plane to erect the same in a straight path.

3. In a gyro vertical, a gyroscope including a rotor casing having means for supporting the same on horizontal axes in substantially neutral equilibrium, a conducting member carried by said casing, a fixed stator comprising a plurality of wound poles arranged in a cruciform with one leg normally lying in the same vertical plane as one of said horizontal axes and the other leg normally lying in the same vertical plane as the other horizontal axis, a three phase supply, means responsive to tilt of the spin axis about one of said horizontal axes for exciting the respective windings of the poles of the leg normally lying in the vertical plane of said tilt axis with the three respective phases of the supply in a predetermined order and responsive to tilt in the opposite direction about said axis with the phase order reversed, and means responsive to tilt about said other horizontal axes for similarly exciting the respective pole windings in the first named leg.

4. In a gyroscope, a gyro rotor and rotor bearing casing, means for supporting the same for oscillation about horizontal axes in substantially neutral equilibrium and with the rotor having a normally vertical spin axis, and gravitationally responsive means for maintaining said spin axis erect including stator and inductor members, one of said members being supported by said supporting means independent of said gyro and the other of said members being carried by said casing, and means controlled from said gravitational means for causing said stator member upon relative tilt of said spin axis and said gravitational means, to induce currents in said inductor member to produce a torque on said casing to precess said spin axis back to the vertical in a direct path.

5. A gyroscope as claimed in claim 4, in which said gravitationally responsive means includes gravity actuated contacts for controlling the supply of energizing current to said stator member.

6. Means for coercing a free or neutral gyroscope for maintaining it in a desired position about one of its two axes of freedom comprising a multiple pole stator member having its poles normally in the same vertical plane as said one axis, an inductor member of sheet metal adjacent said stator, one of said members being mounted on the gyroscope and the other on a relatively fixed part, an A. C. supply for said stator, means for causing the flux supplied by one pole to differ in phase from that supplied by another, to exert a torque on the gyroscope in either direction desired about said other axis.

7. Means for coercing a free or neutral gyroscope as claimed in claim 6, in which said inductive member is on the gyro and said stator is on a relative fixed part whereby no current need be led into the gyroscope.

8. Means for coercing a free or neutral gyroscope for maintaining it in a desired position about both horizontal axes of freedom, comprising a multi-pole stator member having a central pole and four symmetrically arranged outer poles forming two legs, a single-phase supply for exciting all poles, shading coils on the outer poles, an inductive member of sheet metal adjacent said stator, one of said members being mounted on the gyroscope and the other on the relatively fixed part, means responsive to relative inclination of the gyroscope about one axis for short-circuiting a shading coil on a pole of one leg, and means responsive to relative tilt of the gyroscope about the other axis for short-circuiting a shading coil on a pole of the other leg.

9. Means for coercing a free or neutral gyroscope for maintaining it in a desired position about both horizontal axes of freedom, comprising a multi-pole stator member having a central pole and four symmetrically arranged outer poles, shading coils on the outer poles, an inductive member of sheet metal adjacent said stator, one of said members being mounted on the gyroscope and the other on the relatively fixed part, means responsive to relative inclination of the gyroscope about one axis for short-circuiting a shading coil on a pole of one leg, means responsive to opposite tilt for short-circuiting the shading coil on the opposite pole of said leg, means responsive to relative tilt of the gyroscope about the other axis for short-circuiting a shading coil on a pole of the other leg, and means responsive to opposite tilt for short-circuiting the shading coil on the opposite pole of the last-mentioned leg.

10. Means for coercing a gyroscope about one axis which is mounted with three axes of freedom, comprising, a three-pole stator member, the three poles thereof being arranged in line in a plane normal to said axis, a winding on each pole, a three-phase supply for exciting said windings, a curved inductive member adjacent said stator, one of said members being mounted on the gyroscope and the other on a relatively fixed part, means responsive to movement of the gyroscope about said axis in one direction for connecting said supply to the three windings on said stator, and means responsive to opposite movement of the gyroscope about said axis for reversing the connections to two phases of the supply.

11. Means for erecting a gyroscope neutrally mounted about two horizontal axes of freedom, comprising, a five-pole stator arranged in two legs normal to one another, a winding on each pole, a three-phase supply for exciting said windings, a cup-shaped inductive member adjacent said stator, one of said members being mounted on the gyroscope and the other on a relatively fixed part, means responsive to inclination of the gyroscope about one axis in one direction for connecting said supply to the windings on one leg of said stator, means responsive to inclination of the gyro about said other axis for exciting from said supply the poles in the other leg of said stator, and means responsive to opposite inclination about either of said axes for reversing the connections to two phases of the supply.

ORLAND E. ESVAL.
CARL A. FRISCHE.